(12) United States Patent
Hiernaux

(10) Patent No.: US 10,502,143 B2
(45) Date of Patent: Dec. 10, 2019

(54) COMPRESSOR OF AXIAL TURBINE ENGINE WITH CONTRA-ROTATING ROTOR

(71) Applicant: Techspace Aero S.A., Herstal (BE)

(72) Inventor: Stéphane Hiernaux, Oupeye (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 1070 days.

(21) Appl. No.: 14/865,202

(22) Filed: Sep. 25, 2015

(65) Prior Publication Data

US 2016/0102607 A1  Apr. 14, 2016

(30) Foreign Application Priority Data

Oct. 9, 2014  (BE) .................................. 2014/0740

(51) Int. Cl.
*F02C 7/36* (2006.01)
*F02K 3/06* (2006.01)
(Continued)

(52) U.S. Cl.
CPC ................ *F02C 7/36* (2013.01); *F02C 3/067* (2013.01); *F02C 3/107* (2013.01); *F02K 3/06* (2013.01); *F04D 19/024* (2013.01); *F05D 2220/32* (2013.01); *F05D 2260/40* (2013.01); *F05D 2260/40311* (2013.01); *Y02T 50/671* (2013.01)

(58) Field of Classification Search
CPC ............ F02C 3/067; F02C 3/107; F02C 7/36
See application file for complete search history.

(56) References Cited

U.S. PATENT DOCUMENTS 3,673,802 A * 7/1972 Krebs ..................... F02C 3/067
   60/226.1
3,688,505 A * 9/1972 Dison ..................... F02C 3/113
   60/226.1

(Continued)

FOREIGN PATENT DOCUMENTS

| EP | 1921290 A2 | 5/2008 |
| EP | 2270315 A2 | 1/2011 |
| FR | 2217545 A1 | 9/1974 |

OTHER PUBLICATIONS

Jane's Aero-Engines, Issue Seven, Edited by Bill Gunston, Jane's Information Group Inc., Alexandria, Virginia, 2000, pp. 510-512.*

(Continued)

*Primary Examiner* — Lorne E Meade
(74) *Attorney, Agent, or Firm* — James E. Walton

(57) ABSTRACT

The present application relates to an axial turbine engine with a turbine, a low-pressure compressor, and a fan. The turbine drives the compressor and the fan via a plurality of epicyclic reducing gears. The rotor of the compressor includes upstream a disc with a row of vanes and downstream a drum with a plurality of rows of vanes. The disc and the drum are connected to different parts of the epicyclic reducing gears, so as to be counter-rotating. The turbine engine includes a row of stator vanes arranged between two rows of rotor blades of the drum of the compressor, so as to straighten the flow and improve the efficiency. The turbine engine includes at least two epicyclic reducing gears, so that the vane rows of the drum turn faster than that downstream, which itself turns faster than the fan.

12 Claims, 2 Drawing Sheets

(51) Int. Cl.
  *F02C 3/067* (2006.01)
  *F02C 3/107* (2006.01)
  *F04D 19/02* (2006.01)

(56) References Cited

U.S. PATENT DOCUMENTS

| | | | | |
|---|---|---|---|---|
| 3,861,139 A * | 1/1975 | Jones | ............... | F02C 3/067 |
| | | | | 60/226.1 |
| 3,861,140 A * | 1/1975 | Krabacher | ............ | B21D 11/08 |
| | | | | 181/220 |
| 3,903,690 A * | 9/1975 | Jones | ............... | F02C 3/067 |
| | | | | 184/6.11 |
| 4,329,114 A * | 5/1982 | Johnston | ............ | F01D 11/24 |
| | | | | 415/116 |
| 4,482,293 A * | 11/1984 | Perry | ............... | F02C 7/20 |
| | | | | 415/113 |
| 4,751,816 A * | 6/1988 | Perry | ............... | F02K 3/072 |
| | | | | 416/129 |
| 4,827,712 A * | 5/1989 | Coplin | ............... | F02K 3/06 |
| | | | | 415/210.1 |
| 6,158,210 A * | 12/2000 | Orlando | ............... | F02C 3/067 |
| | | | | 29/889.2 |
| 7,966,806 B2 * | 6/2011 | Henry | ............... | F02C 3/067 |
| | | | | 60/226.1 |
| 8,375,695 B2 * | 2/2013 | Schilling | ............... | F01D 15/10 |
| | | | | 310/114 |
| 8,590,286 B2 * | 11/2013 | Roberge | ............... | F01D 1/023 |
| | | | | 60/226.1 |
| 9,534,608 B2 * | 1/2017 | Gehlot | ............... | F04D 19/024 |
| 2008/0120839 A1 | 5/2008 | Schilling | | |
| 2010/0326050 A1 | 12/2010 | Schilling et al. | | |
| 2013/0223984 A1 * | 8/2013 | Gehlot | ............... | F04D 19/024 |
| | | | | 415/68 |

OTHER PUBLICATIONS

The Jet Engine, Rolls-Royce plc, United Kingdom, 2005, pp. 92-99.*

Search Report dated May 29, 2015 from Belgium Patent Appl. No. 2014/0740.

* cited by examiner

COMPRESSOR OF AXIAL TURBINE ENGINE WITH CONTRA-ROTATING ROTOR

This application claims priority under 35 U.S.C. § 119 to Belgium Patent Application No. 2014/0740, filed 9 Oct. 2014, titled "Compressor of Axial Turbine Engine with Contra-Rotating Rotor," which is incorporated herein by reference for all purposes.

BACKGROUND

1. Field of the Application

The present application relates to an axial turbine engine fitted with a transmission. More precisely, the present application relates to a turbojet having a fan, a compressor, and an epicyclic train.

2. Description of Related Art

In order to modulate the rotation speed of the fan, a turbojet is provided with an epicyclic train. It allows the rotor of the low-pressure compressor to be decoupled from the fan, which eliminates technological constraints. The rotation speed of the fan is reduced relative to the compressor rotor, which is advantageous for turbine engines with a high dilution rate, combining a large fan and a compressor of reduced diameter. This technology becomes useful for high-speed compressors, the rotation speed of which is greater than 10,000 rpm or even 15,000 rpm.

The presence of an epicyclic reducing gear also allows certain rows of rotor blades to be made counter-rotating i.e. turning in opposite directions. This allows an increase in the compression rate of the compressor.

Document US 2010/0326050 A1 discloses an axial turbine engine with, from upstream to downstream, a fan, a low-pressure compressor, a high-pressure compressor, turbines linked to the compressors and to the fan. An epicyclic reducing gear connects the fan to the internal rotor of the low-pressure compressor, these units turning in opposite directions at different speeds because of the reduction rate. However such a turbine engine is particularly complex. It has a number of interfaces in motion relative to each other, which requires the same number of sealing joints or bearings in order to limit wear. This arrangement is heavy and bulky, production precision becomes difficult. This configuration requires the addition of bearings or roller bearings between certain moving parts.

Although great strides have been made in the area of turbine engines, many shortcomings remain.

DETAILED DESCRIPTION OF THE PREFERRED EMBODIMENT

Figure 1:
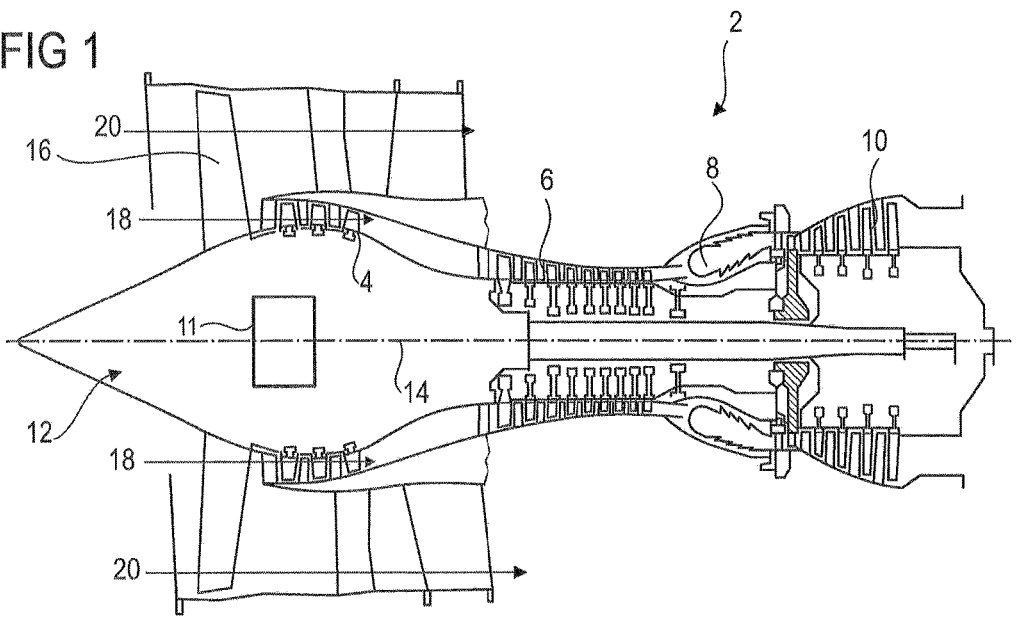
FIG. 1 shows an axial turbine engine according to the present application.

The present application aims to overcome at least one of the problems posed by the prior art. The present application also aims to improve the efficiency of the turbine engine with a fan linked to a compressor via an epicyclic reducing gear. More precisely, the present application also aims to optimise the compression rate and compactness of a compressor.

The present application also discloses an axial turbine engine such as a turbojet comprising a fan, a compressor fitted with a rotor with at least two annular rows of rotor blades, of which two rows are counter-rotating, an epicyclic reducing gear connecting the fan to the compressor rotor and connecting the counter-rotating rows, which is distinguished in that it also comprises an annular row of stator vanes arranged between two rows of rotor blades so as to straighten the flow between the two rows of rotor blades.

According to an advantageous embodiment of the present application, the row of stator vanes is arranged downstream of the two counter-rotating rows of rotor blades which may be two successive rows.

According to an advantageous embodiment of the present application, the epicyclic reducing gear comprises an outer planet wheel, an inner planet wheel and a satellite carrier fixed to the stator of the turbine engine, the one of the two counter-rotating rows being fixed to the outer planet wheel and the other of the two counter-rotating rows being fixed to the inner planet wheel.

According to an advantageous embodiment of the present application, each rotor blade is connected to the rotor via its inner end, wherein the row of stator vanes may be a first row, the compressor also comprising a second row of stator vanes, the counter-rotating rows of vanes being arranged between the first stator row and the second stator row.

According to an advantageous embodiment of the present application, the epicyclic reducing gear comprises a satellite carrier with an upstream portion fixed to the stator of the turbine engine, preferably the epicyclic reducing gear lies inside the vanes of the compressor rotor.

According to an advantageous embodiment of the present application, of the two counter-rotating vane rows, that which is upstream has vanes which are radially larger than that downstream.

According to an advantageous embodiment of the present application, the epicyclic reducing gear is configured such that the row of rotor blades furthest upstream of the compressor is that which turns more slowly.

According to an advantageous embodiment of the present application, the counter-rotating row arranged axially closest to the fan turns at an intermediate speed relative to the rotation speed of the fan and of the other of the two counter-rotating rows.

According to an advantageous embodiment of the present application, the rotor comprises a vaned disc and a vaned drum, the disc supporting one row of vanes and the drum supporting at least two rows of vanes, the disc and the drum each supporting one of the counter-rotating rows of vanes, preferably the disc is arranged upstream of the drum.

According to an advantageous embodiment of the present application, the two rows of rotor blades between which the annular row of stator vanes is arranged, are the at least two rows of vanes supported by the drum.

According to an advantageous embodiment of the present application, the compressor comprises several rows of vanes, of which an upstream row and a downstream row at its ends which are the rows of stator vanes, wherein the compressor may be a low pressure compressor.

According to an advantageous embodiment of the present application, the compressor comprises at least three rows of rotor blades, of which at least two rows are fixed to each other.

According to an advantageous embodiment of the present application, the turbine engine comprises a fixing housing for the fan with at least one, preferably at least two, rows of housing arms passing through a primary flow of the turbine engine, the compressor being arranged downstream of one of the rows of housing arms or between the two rows of housing arms.

According to an advantageous embodiment of the present application, the epicyclic reducing gear comprises an outer planet wheel on which one of the two counter-rotating rows is fixed, and an inner planet wheel on which the other of the two counter-rotating rows and in some cases the fan are fixed.

According to an advantageous embodiment of the present application, the epicyclic reducing gear is a first reducing gear with a first outer planet wheel, the turbine engine also comprising a second epicyclic reducing gear with a second outer planet wheel; the fan being fixed to the second outer planet wheel, the one of the two counter-rotating vane rows being fixed to the first outer planet wheel.

According to an advantageous embodiment of the present application, the epicyclic reducing gears each comprise an inner planet wheel and satellite carrier, the satellite carriers being fixed to the stator of the turbine engine, and the inner planet wheels being joined or fixed to each other.

According to an advantageous embodiment of the present application, the turbine engine comprises a reducing gear between the fan and the epicyclic reducing gear(s) of the turbine engine, the reducing gear being configured so as to reduce the rotation speed of the fan relative to the compressor rotor.

According to an advantageous embodiment of the present application, the housing arms are longer in the direction of flow than they are high perpendicular to the flow.

According to an advantageous embodiment of the present application, the turbine engine comprises seals at the radial level of the inner ends of the rotor blades.

According to an advantageous embodiment of the present application, each vane row of the compressor comprises more than twenty vanes, preferably more than fifty vanes, more preferably more than one hundred vanes.

According to an advantageous embodiment of the present application, each vane of the compressor comprises an inwardly curved surface.

According to an advantageous embodiment of the present application, each or at least one epicyclic reducing gear comprises two inner planet wheels or two outer planet wheels.

According to an advantageous embodiment of the present application, the turbine engine comprises at least three epicyclic trains in cascade, such as at least three epicyclic reducing gears.

According to an advantageous embodiment of the present application, the compressor comprises at least six vane rows, of which at least three are stator vane rows and at least three are rotor blade rows.

According to an advantageous embodiment of the present application, the two counter-rotating rows and the two stator vane rows form a succession of four successive rows.

According to an advantageous embodiment of the present application, the turbine engine comprises a turbine driving the compressor via a transmission shaft.

According to an advantageous embodiment of the present application, each element of the epicyclic reducing gear has a rotation axis which is fixed relative to the stator of the turbine engine.

According to an advantageous embodiment of the present application, the stator vanes of the row of stator vanes arranged between two rows of rotor blades comprise cambered profiles.

The present application allows limitation of turbulence in a compressor with counter-rotating vane rows, which improves the efficiency. The hybrid construction remains simple since the present application benefits from the presence of the outer planet wheel of the reducing gear for attaching a row of rotor blades there. Therefore, this row of vanes turns more slowly than the downstream rows and improves the progressivity of the flow compression.

The proposed architecture is simple, the number of bearings and sealing joints is limited. This configuration forms a mixed compressor with both counter-rotating vane rows and stator vane rows, which allows the omission of one stator vane row. The present solution optimises the compactness, the mass and also the reliability. The compressor is shorter, the drag of the turbine engine is reduced.

In the description below, the terms "interior" or "inner" and "exterior" or "outer" relate to a positioning relative to the axis of rotation of an axial turbine engine.

FIG. 1 shows in simplified fashion an axial turbine engine. Here this is a ducted fan turbojet, but could also be a turboprop engine. The turbojet 2 comprises a first compression level, called the low-pressure compressor 4, a second compression level, called the high-pressure compressor 6, a combustion chamber 8 and one or more levels of turbines 10. In operation, the mechanical power of the turbine 10 transmitted via the central shaft to the rotor 12 sets the two compressors 4 and 6 in motion via at least one transmission shaft. A transmission 11 may increase or reduce the rotation speed of the compressors relative to the turbine. Alternatively, the various stages of the turbines may also each be linked to compressor stages via concentric shafts, in some cases via the transmission 11. The compressors comprise several rows of rotor blades associated with rows of stator vanes. The rotation of the rotor about its rotation axis 14 thus allows an air flow to be created and progressively compressed up to the inlet of the combustion chamber 8.

An inlet blower, normally designated fan 16, is coupled to the rotor 12 and generates an air flow which is divided into a primary flow 18 passing through the abovementioned various levels of the turbine engine, and a secondary flow 20 passing through an annular duct (partially shown) along the machine to then rejoin the primary flow 18 exiting the turbine. The secondary flow 20 generates a thrust reaction thanks to its acceleration, mainly by the fan. The primary flow 18 and secondary flow 20 are annular flows and are ducted by the housing of the turbine engine.

Figure 2:
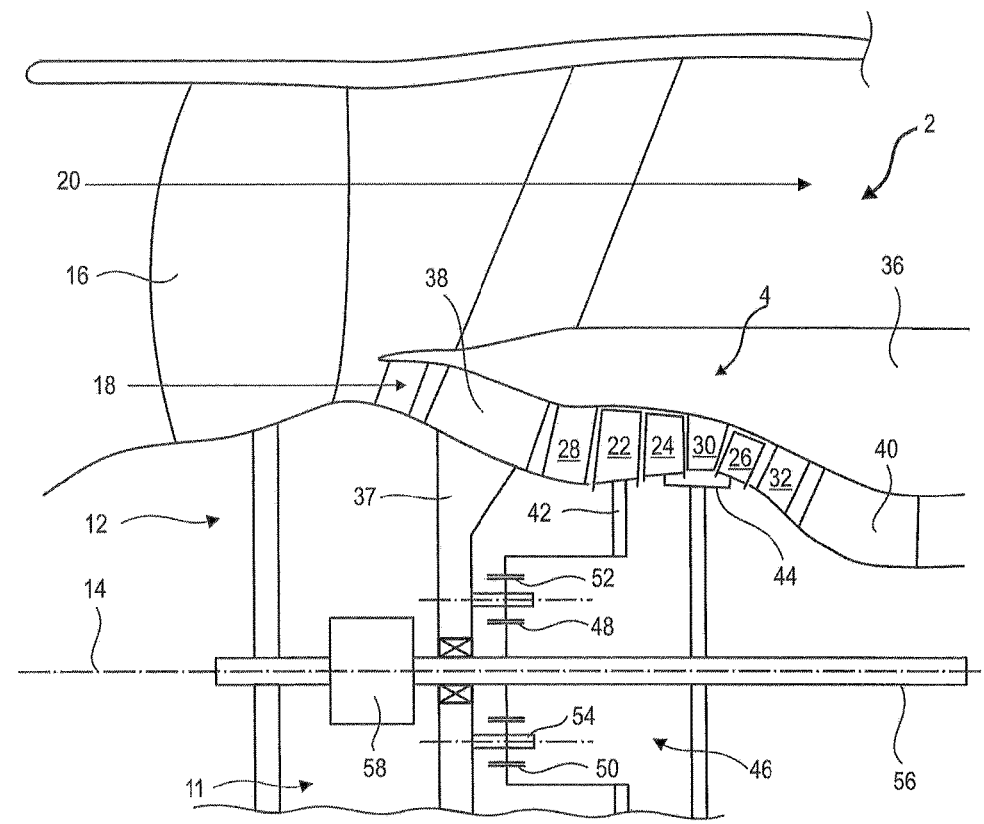
FIG. 2 depicts an upstream portion of the axial turbine engine according to a first embodiment of the present application.

FIG. 2 is a cross section view of an upstream portion of an axial turbine engine 2 as shown in FIG. 1. The low-pressure compressor 4, the fan 16 and a transmission 11 are shown. The rotor 12 comprises several annular rows of rotor blades (22; 24; 26), in this case three.

The low-pressure compressor 4 comprises several straighteners or rectifier, in this case three, which each contain an annular row of stator vanes (28; 30; 32). The straighteners are fixed to the stator 36 of the turbine engine 2, they are associated with the fan 16 or with the rows of rotor blades (22; 24; 26) to straighten the air flow, so as to convert the speed of the flow into pressure. The stator vanes (28; 30; 32) extend substantially radially from an outer housing and may be fixed to this via a shaft or welded; they may also be fixed to inner shrouds. They are higher radially than they are long axially, these dimensions being assessed in the flow direction of the primary flow 18.

The vanes each have a stack of cambered profiles. They each have a front face and a back face which is more extensive than the front face. Each of the stator vanes (28; 30; 32) has a leading edge and a trailing edge which is less inclined relative to the flow than the leading edge. The rotor blades (22; 24; 26) have an opposite arrangement. Thus each stator vane (28; 30; 32) straightens the flow by converting the circumferential component of the flow into an axial component. The rotor blades (22; 24; 26) are fixed via their inner ends, their outer ends are free and can meet the inner face of the wall of the compressor housing. Dynamic joints such as abradable layers cooperate with the outer ends of the vanes.

The stator 36 of the turbine engine 2 comprises a fan fixing housing 37 with housing arms 38 arranged upstream of the low-pressure compressor 4. The housing 37 allows the fan 16 to be connected to the nacelle. The turbine engine 2 also has other housing arms 40 arranged downstream of the low-pressure compressor 4. Each set of arms (38; 40) forms an annular row, and each arm passes through the primary flow 18. The arms (38; 40) are substantially elongated axially and are at least twice as long, preferably at least four times as long axially as the stator vanes (28; 30; 32).

The compressor 4 may comprise, from upstream to downstream, an upstream row of stator vanes 28, two successive rows of rotor blades (22; 24), a row of stator vanes 30, a row of rotor blades 26 and then a downstream row of stator vanes 32. It is noted that four vane rows (24; 30; 26; 32) form an alternating rotor/stator vane pattern, but it is possible that this pattern extends over five, six, seven, eight or more vane rows. Also, the two successive rotor blade rows (22; 24) and/or the two rotor blade rows (22; 24) furthest upstream are counter-rotating and turn in opposite directions. The first row of rotor blades 22 or upstream row 22 is arranged on a disc 42. The second row 24 and third row 26 of rotor blades are connected together by a drum 44 with a generally tubular portion. In this way, these two rows (24; 26) are fixed together and moved by the same rotational movement.

The transmission 11 may comprise at least one epicyclic train 46 such as an epicyclic reducing gear 46. It may comprise at least two, at least three or more epicyclic trains in cascade. An epicyclic train or an epicyclic reducing gear is well known to the person skilled in the art. It generally comprises an inner planet wheel 48, an outer planet wheel 50, one or more satellites 52 which engage with the planet wheels (48; 50), a satellite carrier 54 allowing each satellite 52 to be connected to a transmission shaft 56 or to the stator 36 of the turbine engine 2. The planet wheels (48; 50) are concentric, one of them may be connected to the stator 36 or both may be rotating and connected to transmission shafts.

In the present case, the fan 16 and a downstream portion of the rotor 12 of the compressor 4 are fixed to the inner planet wheel 48. In this way, they turn in the same direction and at the same speed. The satellite carrier 54 is fixed to the stator 36. More precisely, it comprises shafts on which the satellites are mounted rotatably; the upstream ends of said shafts being fixed to the fixing housing 37 of the turbine engine 2. The upstream row of rotor blades 22 of the compressor 4 is linked to the outer planet wheel 50. It turns in the opposite direction and at a lower speed than the rotor blade rows (24; 26) of the compressor situated downstream. The outer planet wheel 50 is mounted rotatably on the transmission shaft 56 to which the inner planet wheel 48 is fixed, they are connected together via pivot links such as bearings.

Optionally, the transmission may comprise a reducing gear 58 between the fan 16 and the epicyclic reducing gear 46, for example connected to the inner planet wheel 48. This reduction may comprise gears, and/or the fan may be eccentric relative to the rotation axis 14. In this way it is possible to reduce the rotation speed of the fan 16 relative to the upstream rotor blade row 22 of the compressor 4. Thus the upstream rotor blade row 22 has an intermediate rotation speed relative to the rotor blade row 24 arranged downstream, and also relative to the fan 16.

Figure 3:
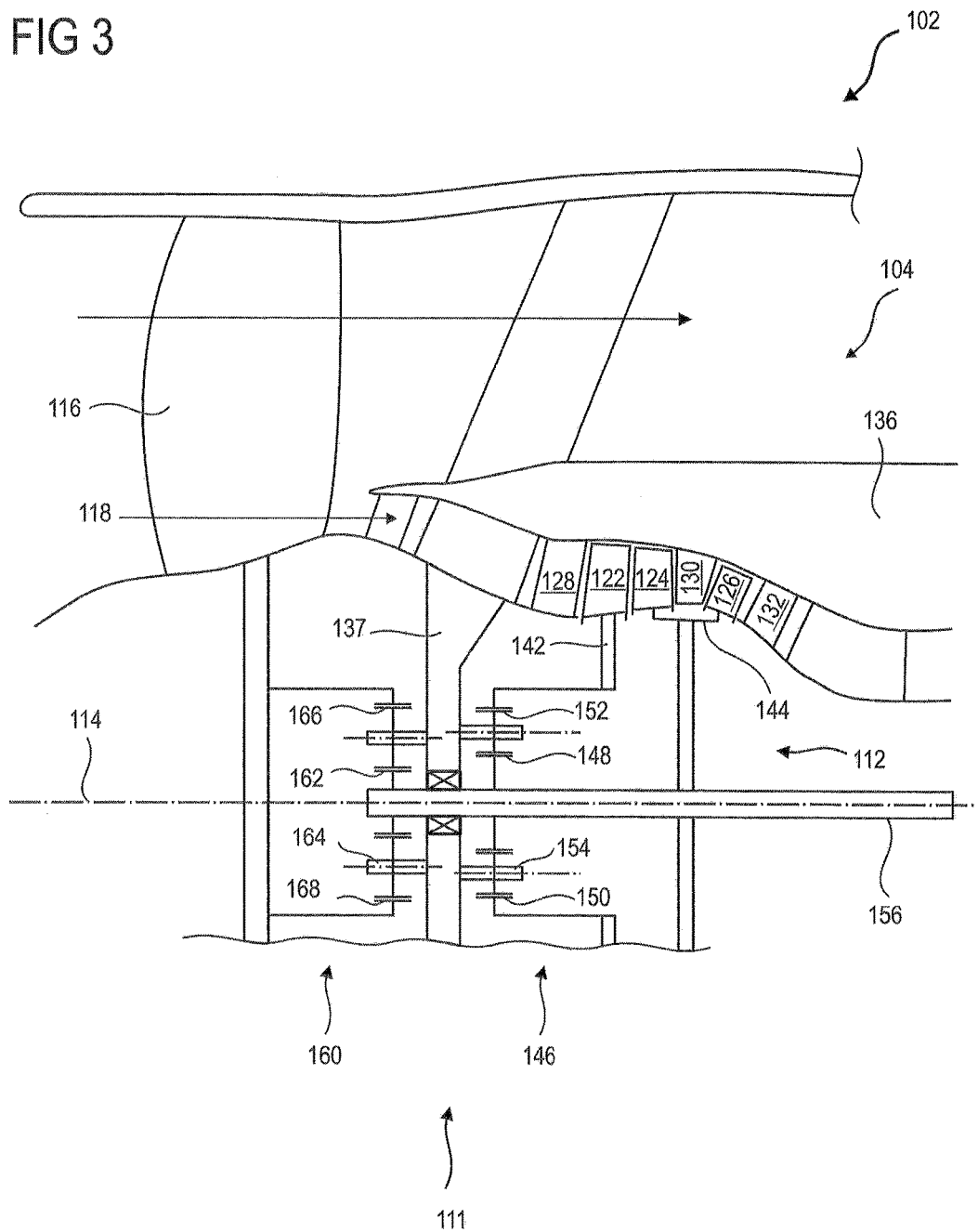
FIG. 3 illustrates an upstream portion of the axial turbine engine according to a second embodiment of the present application.

FIG. 3 shows an upstream portion of the turbine engine 102 according to a second embodiment of the present application. This FIG. 3 repeats the numbering of the previous figures for identical or similar elements, wherein however the numbers are incremented by 100. Specific numbers are used for elements specific to this embodiment.

This FIG. 3 is similar to FIG. 2, and differs essentially in the transmission 111. The transmission 111 comprises at least two epicyclic trains (146; 160) such as epicyclic reducing gears (146; 160), one downstream 146 and one upstream 160, or respectively a first 146 and a second 160. Each reducing gear comprises an inner planet wheel (148; 162), a satellite carrier (154; 164) with satellites (152; 166), and an outer planet wheel (150; 168) driven by the inner planet wheel (148; 162) via the satellites (152; 166). The satellite carriers (154; 164) are fixed to the fixing housing 137 and are therefore firmly attached. Similarly, the inner planet wheels (148; 162) may be fixed to each other. However the outer planet wheels (150; 168) are decoupled. The outer planet wheel 168 of the upstream reducing gear 160 is fixed to the fan 116, that of the downstream reducing gear 146 is fixed to the upstream row of rotor blades 122. A portion of the rotor with the second and third row of rotor blades is fixed to the transmission shaft 156 which is driven by a turbine.

Thanks to this arrangement, the first rotor blade row 122 or upstream row of rotor blades 122 turns in the opposite direction to the rotation direction of the second row 124 and third row 126 of rotor blades. It turns in the same direction as the fan 116. A compression gain is achieved in an axially reduced space. Furthermore, the rotation speed of the first rotor blade row 122 via the disc 142 is an intermediate speed between the rotation speed of the fan and the rotation speed of the second row 124 and third row 126. This benefit offers the advantage of adapting to a reduced rotation speed of the fan and progressively increasing the rotation speed downstream in order to compress the primary flow 118 more progressively.

The epicyclic reducing gears (146; 160) have different reduction ratios, preferably the upstream reducing gear 160 has a demultiplication ratio which is greater than that of the downstream reducing gear 146. The dimensions may be adapted so that they can be integrated inside the compressor, in particular to locate them inside the drum 144 of the rotor 112 of the compressor 104.

The present figure shows a reducing gear train with two epicyclic reducing gears, it is however possible to provide more; similarly, it is possible to link one of the satellite carriers to an inner or outer planet wheel. Each satellite of one of the reducing gears may be fixed to a satellite of another reducing gear, a single inner planet wheel driving the satellites and hence the outer planet wheels at different rotation speeds.

I claim:

1. An axial turbine engine, comprising:
    a stator;
    a fan;
    a transmission driving the fan, the transmission comprising an upstream epicyclic reducing gear, a downstream epicyclic reducing gear, and a transmission shaft, the upstream epicyclic reducing gear comprising:
an upstream outer planet wheel fixed to the fan;
an upstream inner planet wheel fixed to the transmission shaft;
an upstream satellite carrier fixed to an upstream side of the stator; and
one or more upstream satellites which engage with the upstream outer planet wheel and with the upstream inner planet wheel;
the downstream epicyclic reducing gear comprising:
a downstream outer planet wheel;
a downstream inner planet wheel fixed to the transmission shaft;
a downstream satellite carrier fixed to a downstream side of the stator; and
one or more downstream satellites which engage with the a downstream outer planet wheel and with the downstream inner planet wheel; and
a compressor exhibiting successively two annular counter-rotating blade rows and an annular row of stator vanes downstream of the two annular counter-rotating blade rows, wherein the two annular counter-rotating blade rows comprise:
a first row of rotor blades arranged on a disc driven by the downstream outer planet wheel of the downstream epicyclic reducing gear; and
a second row of rotor blades arranged on a drum fixed to the transmission shaft.

2. The axial turbine engine in accordance with claim 1, wherein each rotor blade of the first row of rotor blades is connected to the disc via an inner end and each rotor blade of the second row of rotor blades is connected to the drum via an inner end, and wherein the compressor further comprises:
additional row of stator vanes arranged upstream of the two annular counter-rotating blade rows.

3. The axial turbine engine in accordance with claim 1, wherein the downstream satellite carrier comprises an upstream portion fixed to the stator of the turbine engine, the downstream epicyclic reducing gear lying inside the annular row of stator vanes.

4. The axial turbine engine in accordance with claim 1, wherein the first row of rotor blades has blades which are higher radially than those of the second row of rotor blades.

5. The axial turbine engine in accordance with claim 1, wherein the downstream epicyclic reducing gear is configured such that the first row of rotor blades turns more slowly than the second row of rotor blades.

6. The axial turbine engine in accordance with claim 1, wherein the first row of rotor blades are arranged axially closest to the fan, said first row of rotor blades turns at an intermediate speed relative to the rotation speed of the fan and the rotation speed of the second row of rotor blades of the two annular counter-rotating blade rows.

7. The axial turbine engine in accordance with claim 1, wherein the disc is arranged upstream of the drum.

8. The axial turbine engine in accordance with claim 1, wherein the compressor comprises: a plurality of rows of stator vanes, wherein an upstream row and a downstream row at opposing ends of the compressor define the plurality of rows of stator vanes; wherein the compressor is a low-pressure compressor.

9. The axial turbine engine in accordance with claim 1, wherein the compressor comprises: a third row of rotor blades fixed to the second row of rotor blades.

10. The axial turbine engine in accordance with claim 1, the stator including a fixing housing for the fan with at least one or more rows of housing arms passing through a primary air flow path of the axial turbine engine, the compressor being arranged downstream of one of the at least one or more rows of housing arms.

11. The axial turbine engine in accordance with claim 2, wherein the additional row of stator vanes, the two annular counter-rotating blade rows and the annular row of stator vanes downstream of the two annular counter-rotating blade rows form a succession of four successive rows.

12. An axial turbine engine, comprising:
a fan;
a compressor fitted with a rotor with at least three annular rows of rotor blades, of which two annular rows are counter-rotating;
a transmission shaft;
a reducing gear connecting the fan to the transmission shaft;
an epicyclic reducing gear comprising:
an outer planet wheel;
an inner planet wheel fixed to the transmission shaft;
a satellite carrier fixed to a stator; and
one or more satellites which engage with the outer planet wheel and with the inner planet wheel; and
an annular row of cambered stator vanes;
wherein the at least three annular rows of rotor blades comprise:
a first row of rotor blades arranged on a disc driven by the outer planet wheel of the epicyclic reducing gear; and
a second row of rotor blades and a third row of rotor blades, both being arranged on a drum fixed to the transmission shaft; and
wherein the annular row of cambered stator vanes is arranged between the second row of rotor blades and the third row of rotor blades, the cambered stator vanes being arranged so as to straighten axially the flow between the second row of rotor blades and the third row of rotor blades.

* * * * *